Dec. 7, 1965    H. G. LUTZ ETAL    3,222,035
APPARATUS FOR THE PREPARATION OF SOFT ICE OR MILK ICE
Filed Jan. 19, 1962
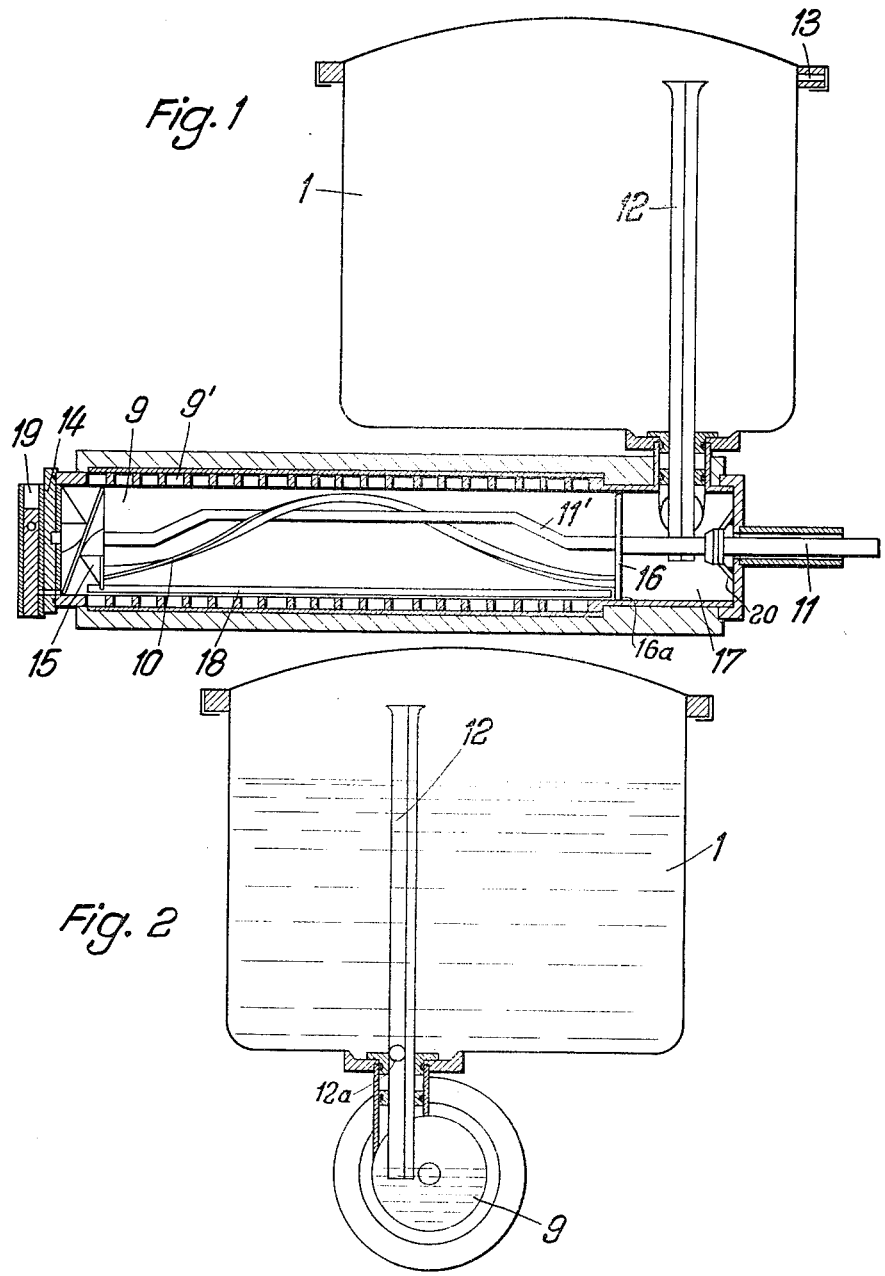
Inventors
HANS GEORG LUTZ
WALDEMAR MENZEL
BY Robert H. Jacob
AGT.

United States Patent Office 3,222,035
Patented Dec. 7, 1965

3,222,035
APPARATUS FOR THE PREPARATION OF SOFT ICE OR MILK ICE
Hans Georg Lutz, Hans Hacker Str. 9, Kulmbach, Germany, and Waldemar Menzel, Siedlung 163, Burghaig, near Kulmbach, Germany
Filed Jan. 19, 1962, Ser. No. 167,323
Claims priority, application Germany, Jan. 21, 1961, G 31,440
2 Claims. (Cl. 259—25)

The present invention relates to the preparation of frozen food products, such as milk ices, and is particularly concerned with apparatus for making milk ice, also referred to as soft ice.

In known apparatuses for the preparation of food ices that are frozen in foamed condition and dispensed in small quantities, referred to as milk ice, also called soft ice, the initial mixture which is usually made of milk, sugar, flavoring and binding agents, is poured into a storage container, and from this container the mix flows through a feed tube which draws in air, and together with such air into a freezing kettle containing a stirring mechanism from which the milk ice is removed in small quantities for immediate consumption. In the freezing kettle of the milk ice freezers, also known as soft ice freezers, there is thus a ready supply of the frozen milk ice for distribution in small quantities. During the stirring this frozen product is fluffed up by the air supplied to the mix, referred to hereafter as injection air, which renders the product more palatable and tasty. However, the milk ice freezers known heretofore permit only a limited and irregular admixture of air. It would, of course, be possible to increase the initial injection air by increasing the stirring or beating movement of the stirring mechanism in the freezing kettle or by whipping up a foam of the milk ice by means of a special stirring mechanism, but this would involve the shortcoming that the initial mixture which usually contains milk fats would separate out butter, and therefore the even consistency would destroyed. Such air increase would only be possible with such types of milk ices that have essentially no fat content and even then only to a limited extent, because otherwise the mix would be battered within a relatively short time. Moreover, in the freezers of the prior art the injected air of the ice is known to have the tendency to decrease during operation and particularly during the dispensing.

It is an object of the present invention to eliminate the foregoing shortcomings. The invention provides a food ice freezer for dispensing ices in portions, the freezing container of which serves simultaneously as a storage space for the frozen ice product that is ready to be dispensed and which has an air space that is under excess pressure, and where the supply container for the initial mix is constructed as an excess pressure container and has an air space which is under excess pressure.

Where reference is made hereinafter to air, it is understood that another suitable gas, such as carbonic acid, may be used in lieu of air.

The stirring mechanism of the ice freezer in accordance with the invention may also be operated at a lower number of rotations than the stirring mechanism of non-soft ice machines. While those machines operate, for example, at 200 r.p.m., the freezers in accordance with the invention may under certain conditions be operated at only 50 r.p.m. The ice mix is therefore protected, but nevertheless a high air content is imparted to it. The added air must, of course, be introduced at a pressure which corresponds to the excess pressure in the air space of the freezing kettle, and the soft ice freezers for dispensing small quantities known heretofore were not equipped for this.

The pressure in the air space of the freezing kettle, and therefore also the excess pressure of the air to be added to the initial mix, must suitably be held within certain limits. If this excess pressure is too high, for example between 2 to 4 atm., then relatively large continuous chains of air bubbles may be formed in the ice foam during the preparation of the milk ice which interfere with the even consistency of the product, that is required especially for this type of food ice product. The excess pressure in the air space is suitably chosen between 0.1 to 2 atm., preferably between 1.3 and 1.6 atm., depending on the desired amount of injected air.

The milk ice freezers of the type on which the invention is predicated are therefore readily distinguished from known frozen product machines which produce larger quantities of ices in a continuous process and expel them as a continuous column of ice, where air under pressure is used for the expulsion or feeding. A known machine of this type has a freezing space in the form of a relatively narrow and elongated inclined tube which is fed from below with mix under pressure which is to be frozen. The pressure is produced by a piston pump which is provided below the end of the freezing tube and drives the mix being frozen through the tube, which it completely fills, toward the upper end of the tube where an outlet is provided. The freezing tube or kettle of the type to which the present invention relates thus contains no ice supply at rest and no air space above the supply, thereby differing from soft ice freezers for the retail dispensing of ice portions. The air pressure produced by the pump of such known machines serves exclusively for feeding the mass through the freezing tube or kettle, which does not contain a feed worm or the like but only a stirring blade mechanism which merely serves for working the mass. The construction of such ice freezers and the maintenance thereof is considerably more cumbersome than with the softe ice freezer in accordance with the invention.

The pressure container which in accordance with the invention serves as the supply container for the initial mix and which has an air space which is under excess pressure, is provided with a compressed air connection. The compressed air may be supplied from a compressed air cylinder and conducted to the supply container by way of the aforementioned connection. It is also possible, however, to produce the compressed air by a special pump arranged outside the ice freezer.

Other advantages and objects of the invention will become apparent if reference is had to the accompanying drawings which show, in schematic illustration, an embodiment of the milk ice freezer in accordance with the invention in which parts that are not essential for the invention have been omitted.

FIGS. 1 and 2 illustrate partly in section a side view and a front view of an embodiment where the supply container of the ice freezer is in the form of a pressure kettle and which is provided with a compressed air connection.

The apparatus comprises the supply container 1 for the ice mix having a feed means such as a feed tube 12 and a freezing kettle 9 including the stirring mechanism. The stirring shaft 11 has connected thereto the stirring coils 10 as well as a stripper or spatula 18, which rotate in the freezing kettle 9, and a feed worm 15. The extension 11' of the shaft 11 which rotates in the kettle 9 is offset from the center, so that the frozen mass will not accumulate in the area of the axis of the kettle. The kettle 9 is preferably arranged as shown, with its axis disposed horizontally, but it may also be inclined. The forward end is closed by a cover 14 which carries the dispensing device 19 for the portions of frozen product. The kettle walls are in the form of a double walled mantle with helical cooling channels 9' through which a cooling agent flows.

The compressed air connection 13 of the supply container 1 which is in the form of a pressure kettle may be connected with a source for supplying compressed air such as a cylinder or an air pump disposed externally of the ice freezer. The compressed air connection may, for example, lead to a supply and mixing tube or a valve 12 in which the introduced compressed air which enters from the top is intimately mixed with the ice mix which enters through the aperture 12a. The compressed air connection may also, as illustrated, lead directly into the air space of the supply container 1 so that the excess pressure is effective upon the upper surface of the initial mix stored in this container. The mixing tube 12 is also present in this arrangement and must be constructed in a manner that the initial mix and the compressed air are brought together on the path to the freezing kettle 9. At the inlet end of the kettle 9 adjacent the stirring mechanism 10 a spaced receiving chamber 17 is defined by a wall 16 so that an ice mix level develops which alternately closes and opens the lower inlet of the mixing tube but which does not permit clogging of this inlet by frozen ice mix. The supply and mixing tube or valve extends with its lower opening below the level of the milk ice which normally is present in the chamber 17. The wall 16 is suitably defined by a disk connected with the stirring shaft 11 which essentially leaves only a narrow gap 16a proximate the wall of the freezing kettle 9. The ice mix enters through this gap 16a into the actual freezing space.

The stirring shaft 11 extends from the forward end of the freezing compartment 9 through said compartment and through said disk 16, through the receiving chamber 17 and projects outwardly from the receiving chamber. A sealing sleeve 20 is provided around the shaft 11 at the end of chamber 17 to prevent the escape of air and liquid ice mix.

The initial mix contained in the ice freezer is not subjected to any mechanical load at all, so that no danger of butter separation exists at that point. The stirring mechanism 10 in the freezing kettle 9 serves only for stripping off the frozen product from the walls of the kettle and does not apply any adverse beating effect. Thus in accordance with the invention initial mixes having high fat contents may be processed into a milk ice of very loose consistency.

In the operation of the apparatus the ice mix enters from the supply container 1 into the receiving chamber 17 through the aperture 12a in tube 12 which is at the bottom of the tube while air enters through tube 12 from the top. Both the mix and the air flow out at the lower end of the tube 12. The supply container is filled with mix to a point below the upper end of supply tube 12. The top of the container 1 is closed and air pressure is applied at 13, which may be derived from a compressed air cylinder or may be produced by a pump. The flow begins until the level of the mix has risen to a point above the lower open end of tube 12 and the pressure in the freezing kettle 9 is substantially the same as the pressure above the mix in supply container 1. Any air displaced by the ice mix that enters through the tube 12 can escape only until the level in the kettle 9 and in chamber 17 has risen to cover the aperture at the lower end of the tube. As a result the further flow of ice mix is interrupted, because whatever air it would displace cannot escape.

If portions of finished ice food product are dispensed through the discharge opening at 14 the level in the receiving chamber 17 drops and since the aperture at the lower end of the tube 12 is again open, new ice mix and new compressed air can flow from the supply container 1 until the opening at the lower end of the tube 12 is again closed.

The invention has been described with reference to the embodiment illustrated in the drawings, but it is not desired to be limited thereto inasmuch as the inventive concept may be applied to different structures without departing from the invention as disclosed and as set forth in the appended claims.

We claim:

1. Apparatus for making a frozen food product such as milk ice arranged for dispensing the product in portions, said apparatus comprising a freezing kettle serving simultaneously as storage container for the ice product ready to be dispensed and including an air space maintained above atmospheric pressure, an ice mix supply container having an air space maintained above atmospheric pressure, feed means connecting said supply container to said storage container, means adapted to be connected to a source of compressed air for supplying air under pressure to said mix supply container, a wall extending transversely of said freezing kettle and into close proximity of the periphery thereof dividing said kettle into a receiving chamber and into a freezing chamber, and stirring means being disposed in said freezing chamber and having a shaft extending through said wall and said receiving chamber and projecting outwardly therefrom and said feed means extending from said supply container to said receiving chamber, said feed means having an aperture at the lower end thereof disposed below the center of said receiving chamber.

2. Apparatus for making a frozen food product such as milk ice arranged for dispensing the product in portions, said apparatus comprising a freezing kettle serving simultaneously as storage container for the ice product ready to be dispensed and including an air space maintained above atmospheric pressure, an ice mix supply container having an air space maintained above atmospheric pressure, feed means connecting said supply container to said storage container, means adapted to be connected to a source of compressed air for supplying air under pressure to said mix supply container, a wall extending transversely of said freezing kettle and into close proximity of the periphery thereof dividing said kettle into a receiving chamber and into a freezing chamber, and stirring means being disposed in said freezing chamber and having a shaft extending through said wall and said receiving chamber and projecting outwardly therefrom and said feed means extending from said supply container to said receiving chamber, said wall being in the form of a disk defining a narrow gap between the upper end thereof and the top of said kettle.

References Cited by the Examiner

UNITED STATES PATENTS

| 2,131,511 | 9/1938 | Gray | 62—69 |
| 2,210,366 | 8/1940 | Godfrey et al. | 259—10 X |
| 2,278,340 | 3/1942 | Weinreich et al. | 62—69 |
| 2,855,007 | 10/1958 | Erickson et al. | |
| 2,924,952 | 2/1960 | Swenson | 62—342 |
| 2,998,963 | 9/1961 | Rinderle | 259—9 |
| 3,004,398 | 10/1961 | Mullins | 62—342 |
| 3,015,218 | 1/1962 | Wakeman | 62—342 |
| 3,018,641 | 1/1962 | Carpigiani | 62—342 |

FOREIGN PATENTS 213,417  2/1961  Austria.

ROBERT A. O'LEARY, *Primary Examiner.*

MEYER PERLIN, *Examiner.*